(12) United States Patent
Guo et al.

(10) Patent No.: US 12,158,098 B1
(45) Date of Patent: Dec. 3, 2024

(54) THERMAL MANAGEMENT SYSTEM OF SHIP COMPOSITE ENERGY POWER SYSTEM AND CONTROL METHOD THEREOF

(71) Applicant: SHANDONG UNIVERSITY OF SCIENCE AND TECHNOLOGY, Qingdao (CN)

(72) Inventors: Bin Guo, Qingdao (CN); Ziliang Zhao, Qingdao (CN); Yifan Fu, Qingdao (CN); Jun Zhao, Qingdao (CN); Zhangu Wang, Qingdao (CN); Jitai Yu, Qingdao (CN); Senhao Shen, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/745,928

(22) Filed: Jun. 17, 2024

(30) Foreign Application Priority Data

Dec. 7, 2023 (CN) .......................... 202311667238.5

(51) Int. Cl.
*H01M 10/615* (2014.01)
*F01P 3/20* (2006.01)
(Continued)

(52) U.S. Cl.
CPC .................. *F01P 3/207* (2013.01); *F01P 5/10* (2013.01); *F01P 7/14* (2013.01); *F02D 41/064* (2013.01);
(Continued)

(58) Field of Classification Search
CPC ...... F01P 3/207; F01P 5/10; F01P 7/14; F01P 2007/146; F01P 2060/00; H01M 10/615;
(Continued)

(56) References Cited

U.S. PATENT DOCUMENTS

2012/0168118 A1* 7/2012 Myers ..................... F01P 11/08
165/51

FOREIGN PATENT DOCUMENTS

| CN | 112078772 A | 12/2020 |
|---|---|---|
| CN | 115832523 A | 3/2023 |

(Continued)

*Primary Examiner* — Stephen P Avila

(57) ABSTRACT

A thermal management system of a ship composite energy power system and a control method thereof are provided, including a thermal management circuit, which includes a seawater heat exchange circuit, an internal combustion engine thermal management circuit, a hydrogen fuel cell thermal management circuit, and a power battery and accessories thermal management circuit. It provides a thermal management control strategy for composite energy of internal combustion engine, fuel cell, and power battery; the various circuits can be independently adjusted; the heat dissipation effect is obvious, and the temperature of each cooling circuit can be better controlled; the energy utilization rate can be improved; the heat can be transferred to the other subsystems, and the heat dissipation area can be enlarged; and the fuel cell circuit can be elevated to the temperature by the heat exchanger and the electric heater, and it can reach the target working temperature more quickly.

2 Claims, 5 Drawing Sheets

(51) Int. Cl.
 *F01P 5/10* (2006.01)
 *F01P 7/14* (2006.01)
 *F02D 41/06* (2006.01)
 *H01M 8/04007* (2016.01)
 *H01M 8/04029* (2016.01)
 *H01M 8/04225* (2016.01)
 *H01M 8/04302* (2016.01)
 *H01M 8/0432* (2016.01)
 *H01M 8/04746* (2016.01)
 *H01M 10/625* (2014.01)
 *H01M 10/6568* (2014.01)
 *H01M 10/6571* (2014.01)
 *H01M 16/00* (2006.01)

(52) U.S. Cl.
 CPC ... *H01M 8/04029* (2013.01); *H01M 8/04037* (2013.01); *H01M 8/04225* (2016.02); *H01M 8/04302* (2016.02); *H01M 8/04358* (2013.01); *H01M 8/04768* (2013.01); *H01M 10/615* (2015.04); *H01M 10/625* (2015.04); *H01M 10/6568* (2015.04); *H01M 10/6571* (2015.04); *H01M 16/006* (2013.01); *F01P 2007/146* (2013.01); *F01P 2060/00* (2013.01); *F02D 2200/021* (2013.01); *F02D 2200/50* (2013.01); *H01M 2220/20* (2013.01); *H01M 2250/20* (2013.01); *H01M 2250/402* (2013.01)

(58) Field of Classification Search
 CPC .......... H01M 10/625; H01M 10/6568; H01M 10/6571; H01M 8/04225; H01M 8/04302; H01M 8/04029; H01M 8/04037; H01M 8/04358; H01M 8/04768; H01M 16/006; H01M 2250/402; H01M 2250/20; H01M 2220/20; F02D 41/064; F02D 2200/021; F02D 2200/50
 See application file for complete search history.

(56) References Cited

FOREIGN PATENT DOCUMENTS

| | | | |
|---|---|---|---|
| CN | 218662337 U | 3/2023 | |
| CN | 116072918 A | 5/2023 | |
| CN | 116141947 A | 5/2023 | |
| CN | 116581330 A | 8/2023 | |
| EP | 3437987 A1 | 2/2019 | |
| KR | 20200038618 A | 4/2020 | |
| WO | 0104984 A1 | 1/2001 | |
| WO | WO-2021221550 A1 * | 11/2021 | ............... B60K 1/00 |
| WO | WO-2022005373 A1 * | 1/2022 | ......... B60H 1/00571 |

* cited by examiner

THERMAL MANAGEMENT SYSTEM OF SHIP COMPOSITE ENERGY POWER SYSTEM AND CONTROL METHOD THEREOF

CROSS-REFERENCE TO RELATED APPLICATIONS

This application claims priority to Chinese Application No. 202311667238.5, filed on Dec. 7, 2023, entitled "THERMAL MANAGEMENT SYSTEM OF SHIP COMPOSITE ENERGY POWER SYSTEM AND CONTROL METHOD THEREOF". These contents are hereby incorporated by reference.

TECHNICAL FIELD

The present disclosure relates to the technical field of methods or devices for directly converting chemical energy into electrical energy, in particular to a thermal management system of a ship composite energy power system and a control method thereof.

BACKGROUND

For the sustainable development of human society and the natural environment, the development of new energy ships has become one of the important means to protect the ship environment, and traditional powered ships have been banned from navigation in some sea areas. The existing pure electric power system of new energy ships has a short driving range, slow heating speed of hydrogen fuel cell power system, and low efficiency of hydrogen internal combustion engine power system. Therefore, composite energy power system has become one of the current development directions. However, there are still shortcomings in the thermal management system for ships with this type of power system. There are already a certain number of patents for single internal combustion engines, fuel cells, and power battery ship thermal management systems, such as CN116072918A ship proton exchange membrane hydrogen fuel cell combined heat and power generation system, CN115832523A Electric ship power battery energy thermal management system, and CN218662337U Ship and thermal management control system thereof. However, due to the single target working temperature of the power source, a separate heat storage tank is generally required, which needs external electric heaters to provide additional power, reducing the available space on the ship and lowering the overall efficiency of the system. Some thermal management systems and control methods still have the problem of not being able to effectively utilize waste heat, further reducing overall efficiency. In addition, due to the limitations of the working environment, the external restrictions on the overall temperature changes of the power system are generally greater than those on land air-cooled environments. Although this may avoid the failure of fuel cell stack icing during cold-start at low-temperature, it will also make it difficult for fuel cell engines to quickly reach the appropriate working temperature, and the existing thermal management systems seldom take this problem into account.

SUMMARY

In response to the above-mentioned technical problems in the existing technology, the present disclosure provides a thermal management system and a control method for a ship composite energy power system with a reasonable design, which overcomes the shortcomings of the existing technology and has good effects.

In order to achieve the above objective, the present disclosure adopts the following technical solution:

The thermal management system of a ship composite energy power system includes a thermal management circuit, wherein the thermal management circuit includes a seawater heat exchange circuit, an internal combustion engine thermal management circuit, a hydrogen fuel cell thermal management circuit, a power battery and accessories thermal management circuit. The seawater heat exchange circuit configured to dissipate heat by exchanging heat with the internal combustion engine thermal management circuit, the hydrogen fuel cell thermal management circuit, and the power battery and accessories thermal management circuit. The internal combustion engine thermal management circuit is configured to control the internal combustion engine to operate at a suitable temperature and provide heat for heating other circuits. The hydrogen fuel cell thermal management circuit is configured to maintain the hydrogen fuel cell at a suitable temperature and is used to assist in the heat dissipation of the internal combustion engine thermal management circuit and to increase the temperature of the power battery and accessories thermal management circuit. The power battery and accessories thermal management circuit is configured to maintain the power battery and accessories at a suitable working temperature.

The advantageous technical effects brought by the present disclosure:

1. The present disclosure can provide thermal management control strategies for composite energy sources of internal combustion engines, fuel cells, and power batteries. Each circuit controls the flow of coolant through an electronic water pump and a three-way electromagnetic valve, which can be independently adjusted. Using seawater for cooling has a significant heat dissipation effect and better control of the temperature of each cooling circuit. Using waste heat from internal combustion engines to heat up fuel cell systems and power battery systems, improving energy utilization efficiency. When the heat dissipation pressure is high, heat can be transferred to other subsystems, indirectly increasing the heat dissipation area.

2. The fuel cell circuit of the present disclosure is equipped with a heat exchanger and an electric heater to jointly increase the temperature, which can quickly reach the target working temperature range, improve the performance of the fuel cell engine, reduce the consumption of the electric heater, and improve the overall efficiency of the system. At the same time, due to the fact that the internal combustion engine works first to provide heating for the hydrogen fuel cell circuit under low temperature condition, it can improve the cold-start speed of the hydrogen fuel cell and prevent low-temperature cold-start failure.

3. The present disclosure utilizes ambient temperature sensors to add temperature sensors before and after three components to transmit signals to the ship controller to control the opening of the electromagnetic valve and the speed of the water pump in the circuit. The composite energy ship is divided into four modes: independent operation of the internal combustion engine, co-operation of the internal combustion engine, the fuel cell, and the power battery, co-operation of the fuel cell and the power battery, and independent operation of the power battery, which can cope with different environments and working conditions.

Figure 1:
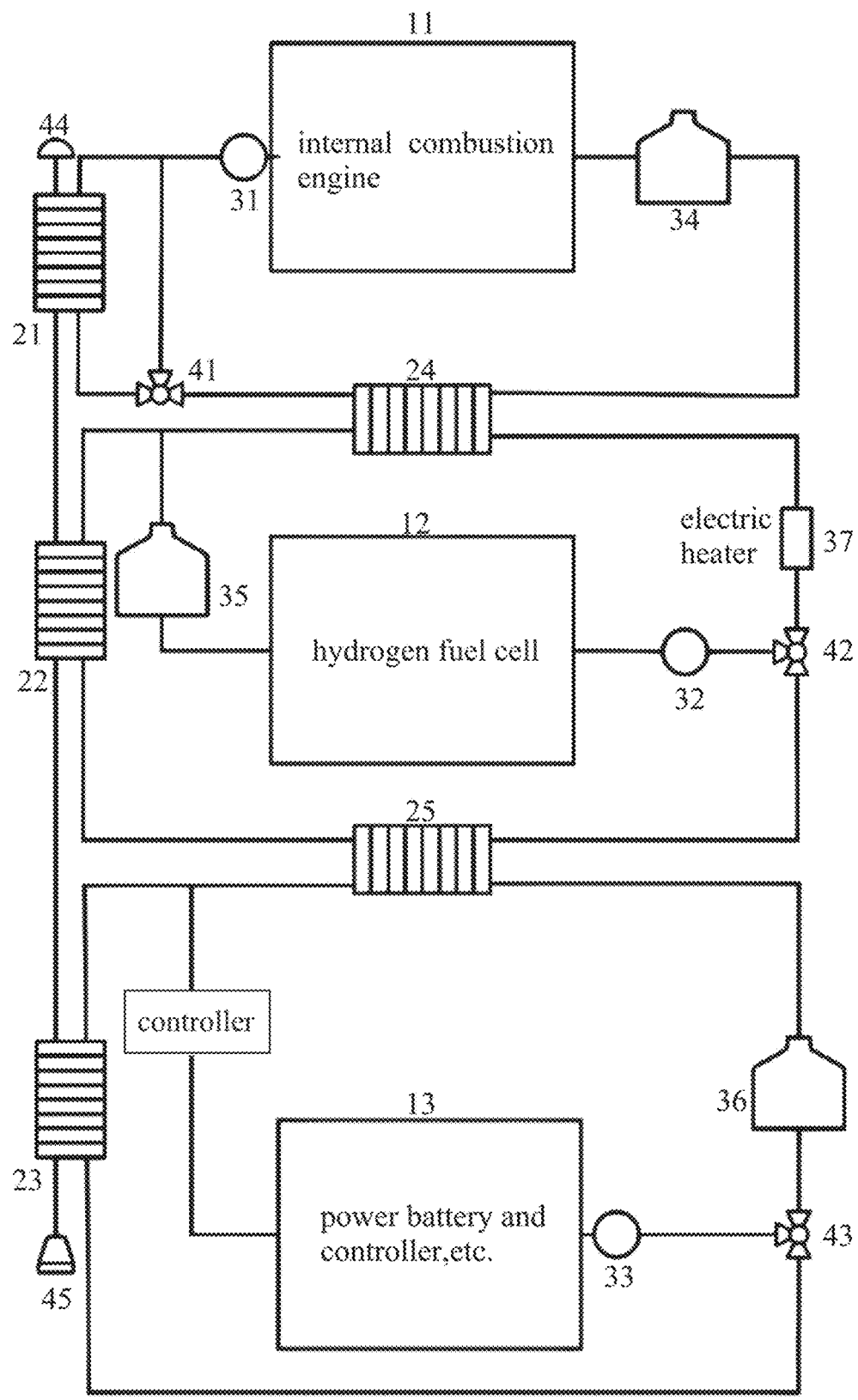
FIG. 1 is a schematic diagram of the cooling circuit of a composite energy system.

REFERENCE MARKS IN FIGURES 11. internal combustion engine, 12. hydrogen fuel cell, 13. power battery, 21. first heat exchanger, 22. second heat exchanger, 23. third heat exchanger, 24. fourth heat exchanger, 25. fifth heat exchanger, 31. first water pump, 32. second water pump, 33. third water pump, 34. first expansion water tank, 35. second expansion water tank, 36. third expansion water tank, 37. electric heater, 41. first electromagnetic three-way valve, 42. second electromagnetic three-way valve, 43. third electromagnetic three-way valve, 44. seawater inlet, 45. seawater outlet.

DETAILED DESCRIPTION OF THE EMBODIMENT

In order to make the technical problems, technical solutions and beneficial effects of the present invention clearer, the present invention will be further described in detail below with reference to the accompanying drawings and embodiments.

In the present invention, the terms "first," "second," "third" and the like are merely for the purpose of description, but cannot be understood as indicating or implying relative importance. The term "multiple" means two or more unless otherwise explicitly defined. The terms "mount," "connect with," "connect," "fix," and the like shall be understood in a broad sense. For example, "connect" may mean being fixedly connected, detachably connected, or integrally connected; and "connect with" may mean being directly connected or indirectly connected through an intermediary. For those of ordinary skill in the art, specific meanings of the above terms in the present invention can be understood according to specific situations.

In the description of the present invention, it should be understood that if orientation or position relations indicated by the terms such as "upper," "lower," "left," "right," "front," "back," and the like are based on the orientation or position relations shown in the drawings, and the terms are intended only to facilitate the description of the present invention and simplify the description, rather than indicating or implying that the apparatus or element referred to must have a particular orientation and be constructed and operated in the particular orientation, and therefore cannot be construed as a limitation on the present invention.

As shown in FIG. 1, based on the different components of the coolant and the optimal working temperature of each component, the present disclosure divides the thermal management circuit into four circulation loops, a seawater heat exchange circuit, an internal combustion engine thermal management circuit, a hydrogen fuel cell thermal management circuit, a power battery and accessories (For example, controller) thermal management circuit. This allows the entire cooling system to have four different temperature zones, making temperature adjustment more convenient.

Wherein, the coolant flows through the seawater thermal management circuit is seawater, with the lowest temperature. Other circuits mainly dissipate heat through heat exchange with this circuit. The internal combustion engine has the lowest efficiency, and the thermal management circuit has the highest temperature, without additional heating part, it can use excess heat to help the hydrogen fuel cell circuit heat up, reduce the use of the electric heater, and use specialized antifreeze as the coolant. The hydrogen fuel cell have the strictest temperature requirements. on the one hand, it needs to quickly increase the temperature to improve fuel cell performance, and on the other hand, the temperature should not be too high to damage the fuel cell stack, thus, the antifreeze with strict control of ion concentration is used as the coolant. The power battery and the controller and other related accessories have high efficiency, less heat dissipation, the lowest operating temperature, and little sensitivity to temperature. Each accessory can share one cooling circuit, and the coolant has no special requirements for ion concentration.

Figure 2:
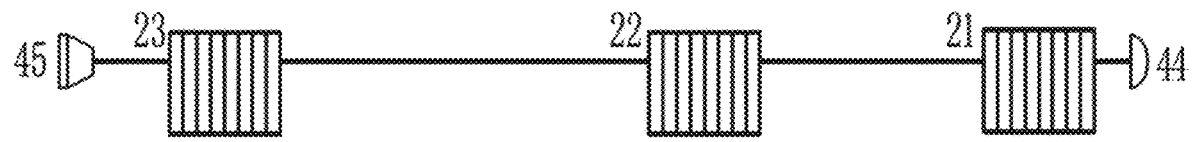
FIG. 2 is a schematic diagram of the seawater heat exchange circuit.

As shown in FIG. 2, the seawater heat exchange circuit consists of a first heat exchanger 21, a second heat exchanger 22, a third heat exchanger 23, a seawater inlet 44, a seawater outlet 45, and pipelines connecting the components mention above. The seawater inlet 44, the first heat exchanger 21, the second heat exchanger 22, the third heat exchanger 23, and the seawater outlet 45 are sequentially connected through pipelines. During ship travelling, seawater flows through three heat exchangers from the inlet and is discharged from the outlet, ensuring that the temperature in the seawater heat exchange circuit is always close to the seawater temperature, thereby ensuring heat exchange efficiency.

Figure 3:
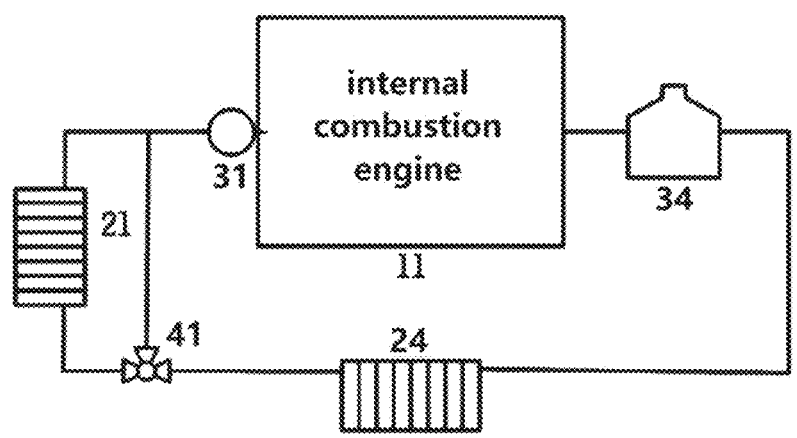
FIG. 3 is a schematic diagram of the internal combustion engine thermal management circuit.

As shown in FIG. 3, the internal combustion engine thermal management circuit includes an internal combustion engine 11, a first heat exchanger 21, a fourth heat exchanger 24, a first water pump 31, a first expansion water tank 34, and a first electromagnetic three-way valve 41. The internal combustion engine 11, the first water pump 31, the first heat exchanger 21, the first electromagnetic three-way valve 41, the fourth heat exchanger 24, and the first expansion water tank 34 form a closed loop through pipelines. The first electromagnetic three-way valve 41 is connected to the first water pump 31 through pipelines. The first water pump 31 is used to drive the flow of coolant in the entire internal combustion engine thermal management circuit, taking away the heat generated during the operation of internal combustion engine 11. The first expansion water tank 34 is used to ensure that the air inside the internal combustion engine thermal management circuit can be discharged in a timely manner after the coolant is heated. The first heat exchanger 21 is used to exchange heat between the internal combustion engine thermal management circuit and the seawater heat exchange circuit, with the highest cooling efficiency. The fourth heat exchanger 24 is used to exchange heat between the internal combustion engine thermal management circuit and the hydrogen fuel cell thermal management circuit, the main purpose is to help the coolant in the hydrogen fuel cell engine circuit quickly reach the appropriate operating temperature.

The first electromagnetic three-way valve 41 is used to adjust the heat dissipation. As the heat dissipation increases, the opening of the first electromagnetic three-way valve 41 is adjusted to allow more coolant to flow through the heat exchanger between the seawater heat exchange circuit, ensuring stable operation of the internal combustion engine.

Figure 4:
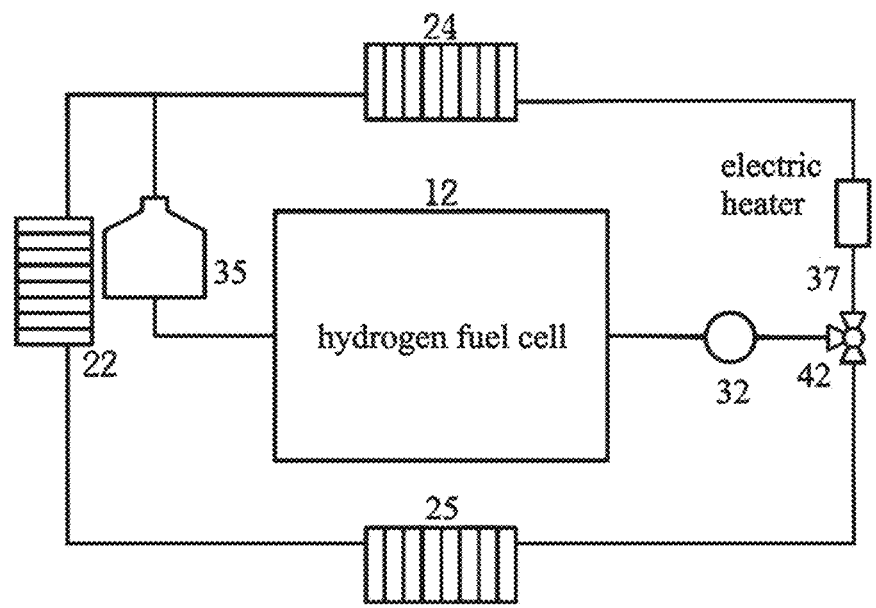
FIG. 4 is the schematic diagram of the hydrogen fuel cell thermal management circuit.

As shown in FIG. 4, the hydrogen fuel cell thermal management circuit includes a hydrogen fuel cell 12, a second heat exchanger 22, a fourth heat exchanger 24, and a fifth heat exchanger 25, a second water pump 32, a second expansion water tank 35, an electric heater 37, and a second electromagnetic three-way valve 42. The hydrogen fuel cell 12, the second expansion water tank 35, the second heat exchanger 22, the fifth heat exchanger 25, the second electromagnetic three-way valve 42, and the second water pump 32 form a closed loop through pipelines. The hydrogen fuel cell 12, the second expansion water tank 35, the fourth heat exchanger 24, electric heater 37, the second electromagnetic three-way valve 42, and the second water pump 32 form another closed loop through pipelines. The second water pump 32 is used to drive the flow of coolant in the entire hydrogen fuel cell thermal management circuit, ensuring heat circulation and reducing the temperature difference between the inlet and outlet of the hydrogen fuel cell. The second expansion water tank 35 is used to ensure that the air inside the hydrogen fuel cell thermal management circuit can be discharged in a timely manner after the coolant is heated. The second heat exchanger 22 is used to exchange heat between the hydrogen fuel cell thermal management circuit and the seawater heat exchange circuit, reducing the temperature of the coolant flowing through the heat exchanger. The fourth heat exchanger 24 is used to exchange heat between the hydrogen fuel cell thermal management circuit and the internal combustion engine thermal management circuit. The electric heater 37 is used for heating and increasing the temperature of flowing coolant. The fifth heat exchanger 25 is used to exchange heat between the hydrogen fuel cell thermal management circuit and the power battery and accessories thermal management circuit, on the one hand, it reduces the temperature of the coolant, and on the other hand, it increases the cooling temperature in the power battery and accessories thermal management circuit. Three heat exchangers and an electric heater 37 create two streams of flowing water with large temperature differences in the thermal management circuit. By adjusting the opening of the second electromagnetic three-way valve 42, the final flow rate of different parts is determined, so as to control the inlet temperature of the hydrogen fuel cell.

Figure 5:
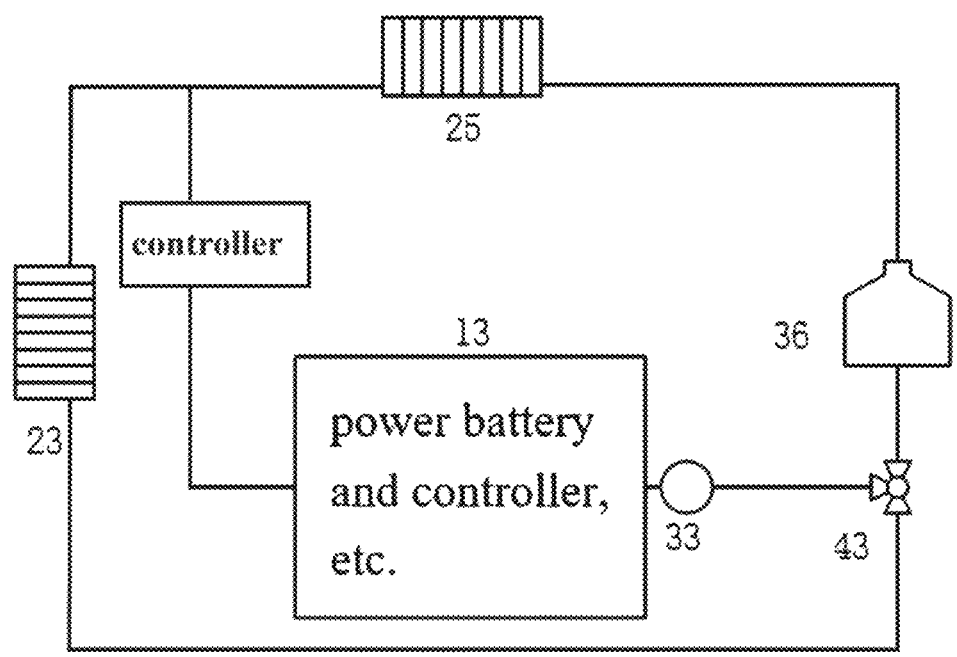
FIG. 5 is a schematic diagram of the thermal management circuit of power batteries and accessories.

As shown in FIG. 5, the power battery and accessories thermal management circuit includes a power battery 13, a controller, a third heat exchanger 23, a fifth heat exchanger 25, a third water pump 33, a third expansion water tank 36, and a third electromagnetic three-way valve 43. The power battery 13, the controller, the third heat exchanger 23, the third electromagnetic three-way valve 43, and the third water pump 33 form a closed loop through pipelines. The power battery 13, the controller and related accessories, the fifth heat exchanger 25, the third expansion water tank 36, the third electromagnetic three-way valve 43, and the third water pump 33 form another closed loop through pipelines. The third water pump 33 is used to drive the flow of coolant in the entire power battery and accessories thermal management circuit, ensuring heat circulation. The third expansion water tank 36 is used to ensure that the air inside the power battery and accessories thermal management circuit can be discharged in a timely manner after the coolant is heated. The third heat exchanger 23 is used to exchange heat between the power battery and accessories thermal management circuit and the seawater heat exchange circuit, reducing the temperature of the coolant flowing through the third heat exchanger. The fifth heat exchanger 25 is used to exchange heat between the power battery and accessories thermal management circuit and the hydrogen fuel cell thermal management circuit, increasing the temperature of the coolant flowing through the fifth heat exchanger. The third electromagnetic three-way valve 43 is used to regulate the final temperature of the coolant flowing through components such as the power battery through different flow paths.

The present disclosure can utilize ambient temperature sensors and the three temperature sensors arranged in the front of the components to transmit signals to the vehicle controller to control the opening of the electromagnetic valves and the speed of the water pumps in the circuit. The composite energy ship is divided into four modes: independent operation of the internal combustion engine, co-operation of the internal combustion engine, the fuel cell, and the power battery, co-operation of the fuel cell and the power battery, and independent operation of the power battery, which can cope with different environments and working conditions. Therefore, the thermal management system also needs to be able to complete thermal management functions in different working modes.

Figure 6:
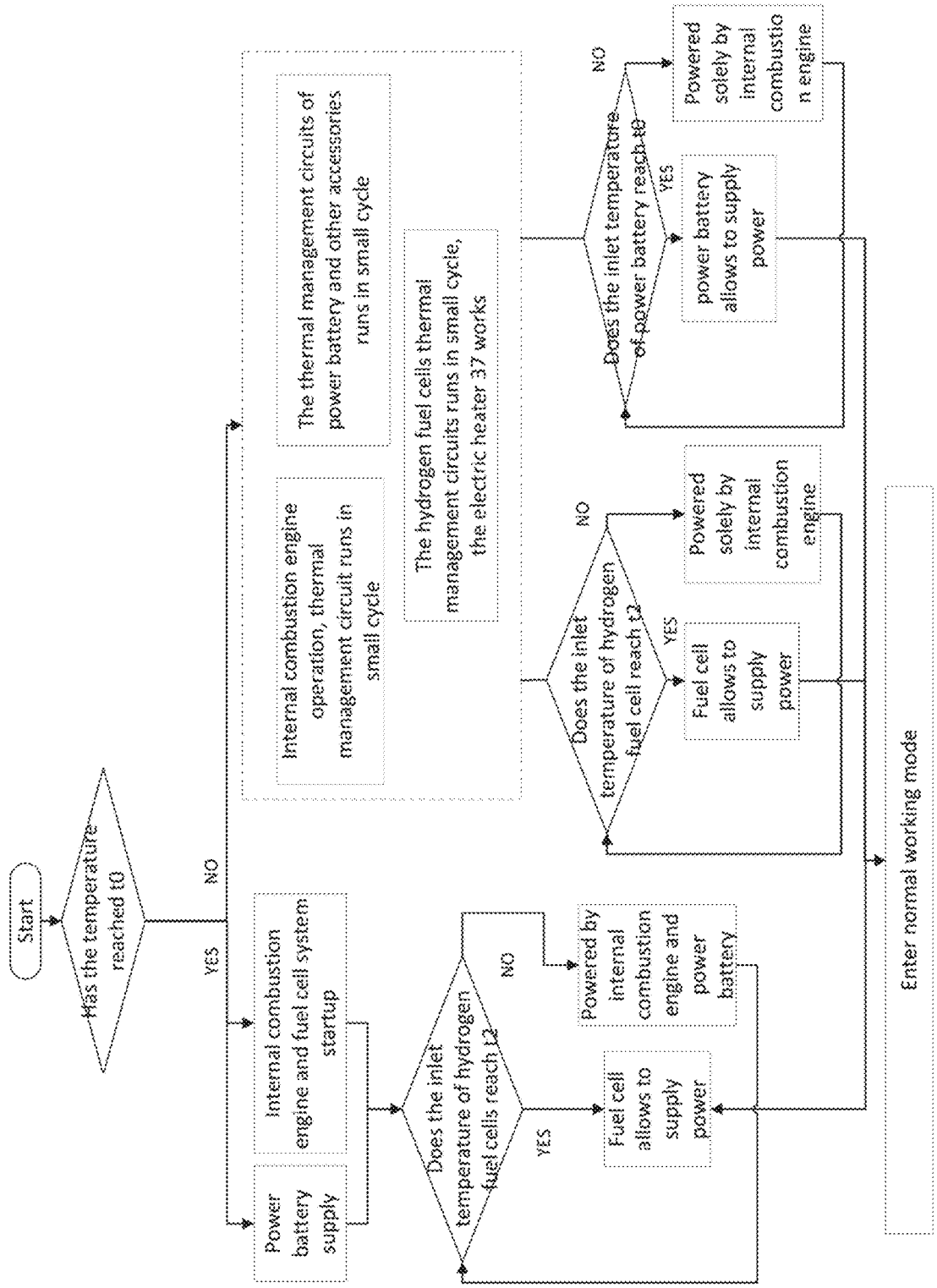
FIG. 6 is a schematic diagram of the cold-start working mode.
Figure 7:
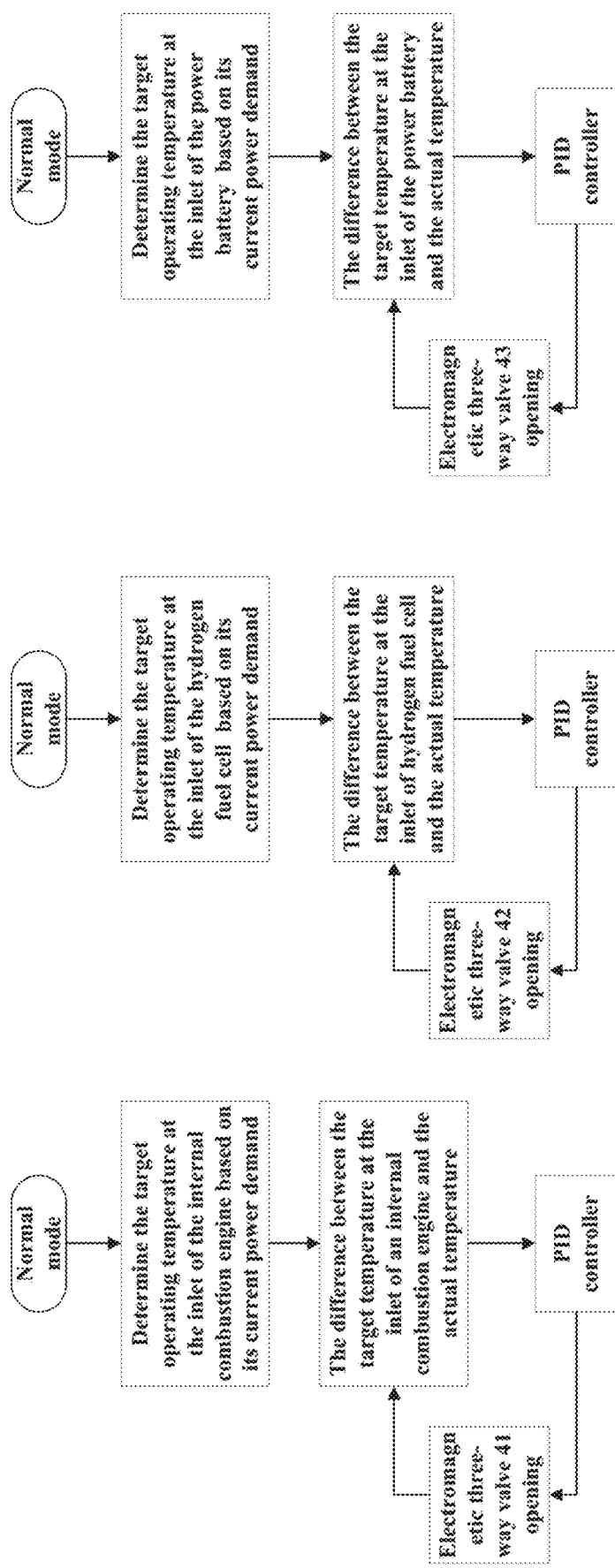
FIG. 7 is a schematic diagram of the normal working mode.

The thermal management working mode is divided into two situations: a cold-start shown in FIG. 6 and a normal mode shown in FIG. 7.

Cold-start is divided into two modes: normal temperature cold-start and low temperature cold-start. In both modes, when the power system starts working, the power battery first supplies power to auxiliary components such as the water pumps to ensure normal coolant flow. However, due to poor performance of the power battery at low temperature, the power battery starts supplying power to the ship power system when the inlet temperature of the power battery reaches to.

The working mode of thermal management is divided into two situations: cold-start and normal mode, and the cold-start is divided into two modes: normal temperature cold-start and low temperature cold-start.

t0 is the boundary between low temperature cold-start and normal temperature cold-start, t1 is the lower limit of the working temperature range of the internal combustion engine, t4 is the upper limit of the working temperature range of the internal combustion engine, t2 is the lower limit of the working temperature range of the hydrogen fuel cell, t5 is the upper limit of the working temperature range of the hydrogen fuel cell, t3 is the lower limit of the working temperature range of the power battery, and t6 is the upper limit of the working temperature range of the power battery.

The low temperature cold-start control method: When the ambient temperature is below t0, it enters a low temperature cold-start cycle. The internal combustion engine works first, the first electromagnetic three-way valve has a small opening, and the thermal management circuit of internal combustion engine runs in a small cycle, increasing the temperature of the coolant flowing through the fourth heat exchanger, until the inlet temperature of the internal combustion engine reaches t1. Gradually change the opening of the first electromagnetic three-way valve to control the internal combustion engine to work at the temperature between t1 and t4. The second electromagnetic three-way valve in the thermal management circuit of the hydrogen fuel cell has a small opening, running in a small cycle, the electric heater works to increase the inlet temperature of the hydrogen fuel cell until the inlet temperature of the hydrogen fuel cell reaches t0, then the PTC (positive temperature coefficient) electric heater stops working and the hydrogen fuel cell starts to start. When the inlet temperature reaches t2, the opening of the second electromagnetic three-way valve is gradually adjusted to control the hydrogen fuel cell working at the temperature between t2 and t5. The third electromagnetic three-way valve in the thermal management circuit of the power battery and auxiliary components has a small opening, running in a small cycle, that is, the coolant flows from the third water pump to the power battery and the auxiliary components, then to the fifth heat exchanger, and then flows through the third expansion water tank and returns to the third water pump through the third electromagnetic three-way valve. Until the inlet temperature of coolant reaches t0, the power battery begins to supply power to the ship composite energy power system. After the inlet temperature reaches t3, the opening of the third electromagnetic valve is controlled to keep the inlet temperature of coolant between t3 and t6.

The normal temperature cold-start control method: When the ambient temperature is above t0, it enters the normal temperature cold-start cycle. The power battery starts working first to increase the starting speed of the ship, while starting the fuel cell and internal combustion engine. After the internal combustion engine is started, it works together with the power battery to provide power for the forward movement of the ship. Before the inlet temperature of the fuel cell reaches t2, it is in idle operation mode, and after reaching t2, it enters normal working mode. At this stage, the first electromagnetic three-way valve in the internal combustion engine circuit has a small opening, increasing the temperature of the coolant flowing through the fourth heat exchanger until the inlet temperature of the internal combustion engine reaches t1. The opening of the first electromagnetic three-way valve is gradually changed to control the internal combustion engine to operate at the temperature between t1 and t4. The second electromagnetic three-way valve in the thermal management circuit of the hydrogen fuel cell has a small opening, running in a small cycle, to increase the inlet temperature of the hydrogen fuel cell until the inlet temperature of the hydrogen fuel cell reaches t2. The opening of the second electromagnetic three-way valve is gradually adjusted to control the hydrogen fuel cell working at the temperature between t2 and t5. The third electromagnetic three-way valve in the thermal management circuit of the power battery and auxiliary components has a small opening, and the circuit goes through a small cycle until the inlet temperature of coolant reaches t3, then controlling the opening of the third electromagnetic three-way valve to control the inlet temperature of coolant between t3 and t6.

Temperature control method under normal working mode: During normal operation, the temperature of each component is controlled by the opening of its own circuit three-way electromagnetic valve. Due to the different heat production at different powers, in order to ensure that each component always maintains its suitable working temperature and prevent damage to the components due to excessive heat production, the inlet target working temperature is calculated based on the current target output power. Using the target working temperature as a feed-forward value, and subtracting it from the actual inlet temperature to obtain the PID controller input. Finally, the output of the controller determines the openings of the first electromagnetic three-way valve, the second electromagnetic three-way valve, and the third electromagnetic three-way valve, making the actual temperature close to the target working temperature.

The present disclosure is used for a composite energy system of internal combustion engines, fuel cells, and power batteries. The internal combustion engine referred to in the present disclosure can be used in addition to traditional gasoline engines and diesel engines, as well as ammonia internal combustion engines, methanol internal combustion engines, hydrogen oxygen internal combustion engines, etc. The present disclosure is mainly aimed at the composite energy system used in ships, and can provide thermal management control strategies for composite energy sources of internal combustion engines, fuel cells, and power batteries. Each circuit controls the flow of coolant through water pumps and three-way electromagnetic valves, which can be independently adjusted. Using seawater for cooling has a significant heat dissipation effect and better control of the temperature of each cooling circuit.

Certainly, the above descriptions are merely preferred embodiments of the present disclosure. The present disclosure is not limited to the above embodiments listed. It should be noted that, all equivalent replacements and obvious variations made by any person skilled in the art under the teaching of the specification fall within the essential scope of the specification and shall be protected by the present disclosure.

What is claimed is:

1. A thermal management system of a ship composite energy power system, comprising a thermal management circuit, wherein the thermal management circuit comprises a seawater heat exchange circuit, an internal combustion engine thermal management circuit, a hydrogen fuel cell thermal management circuit, a power battery and accessories thermal management circuit;

the seawater heat exchange circuit is configured to dissipate heat with the internal combustion engine thermal management circuit, the hydrogen fuel cell thermal management circuit, and the power battery and accessories thermal management circuit; the internal combustion engine thermal management circuit is configured to control the internal combustion engine to operate at a suitable temperature and provide heat for the hydrogen fuel cell thermal management circuit; the hydrogen fuel cell thermal management circuit is configured to maintain the hydrogen fuel cell at a suitable temperature, assist in cooling the internal combustion engine thermal management circuit, and increase the temperature of the power battery and accessories thermal management circuit; and the power battery and accessories thermal management circuit is configured to maintain the power battery and auxiliary components at a suitable operating temperature;

the seawater heat exchange circuit comprises a first heat exchanger, a second heat exchanger, a third heat exchanger, a seawater inlet, a seawater outlet, and pipelines connecting various components; and the seawater inlet, the first heat exchanger, the second heat exchanger, the third heat exchanger, and the seawater outlet are sequentially connected through the pipelines;

the internal combustion engine thermal management circuit comprises an internal combustion engine, the first heat exchanger, a fourth heat exchanger, a first water pump, a first expansion water tank, and a first electromagnetic three-way valve; the internal combustion engine, the first water pump, the first heat exchanger, the first electromagnetic three-way valve, the fourth heat exchanger, and the first expansion water tank form a closed loop through the pipelines, and the first electromagnetic three-way valve is connected to the first water pump through the pipelines; the first water pump is configured to drive coolant in the internal combustion engine thermal management circuit to flow, taking away heat generated during operation of the internal combustion engine; the first expansion water tank is configured to ensure timely discharge of air inside the internal combustion engine thermal management circuit; the first heat exchanger is configured to exchange heat between the internal combustion engine thermal management circuit and the seawater heat exchange circuit; the fourth heat exchanger configured to exchange heat between the internal combustion engine thermal management circuit and the hydrogen fuel cell thermal management circuit; and the first electromagnetic three-way valve is configured to adjust heat dissipation;

the hydrogen fuel cell thermal management circuit comprises a hydrogen fuel cell, the second heat exchanger, the fourth heat exchanger, a fifth heat exchanger, a second water pump, a second expansion water tank, an electric heater, and a second electromagnetic three-way valve; the hydrogen fuel cell, the second expansion water tank, the second heat exchanger, the fifth heat exchanger, the second electromagnetic three-way valve, and the second water pump form a closed loop through the pipelines; the hydrogen fuel cell, the second expansion water tank, the fourth heat exchanger, the electric heater, the second electromagnetic three-way valve, and the second water pump form another closed loop through the pipelines; the second water pump is configured to drive coolant in the hydrogen fuel cell thermal management circuit to flow, ensuring heat circulation and reducing the temperature difference between an inlet and an outlet of the hydrogen fuel cell; the second expansion water tank is configured to ensure timely discharge of air inside the hydrogen fuel cell thermal management circuit; the second heat exchanger is configured to exchange heat between the hydrogen fuel cell thermal management circuit and the seawater heat exchange circuit; the fourth heat exchanger is configured to exchange heat between the hydrogen fuel cell thermal management circuit and the internal combustion engine thermal management circuit; the electric heater is configured to increase temperature of coolant flowing through the electric heater; the fifth heat exchanger is configured to exchange heat between the hydrogen fuel cell thermal management circuit and the power battery and accessories thermal management circuit, reducing temperature of coolant flowing through the fifth heat exchanger in the hydrogen fuel cell thermal management circuit, and increasing temperature of coolant flowing through the fifth heat exchanger in the power battery and accessories thermal management circuit; and the second electromagnetic three-way valve is configured to regulate heat dissipation;

the power battery and accessories thermal management circuit comprises the power battery, a controller, the third heat exchanger, the fifth heat exchanger, a third water pump, a third expansion water tank, and a third electromagnetic three-way valve; the power battery, the controller, the third heat exchanger, the third electromagnetic three-way valve, and the third water pump form a closed loop through the pipelines; the power battery, the controller, the fifth heat exchanger, the third expansion water tank, the third electromagnetic three-way valve, and the third water pump form another closed loop through the pipelines; the third water pump is configured to drive coolant in the power battery and accessories thermal management circuit to flow, ensuring heat circulation; the third expansion water tank is configured to ensure to timely discharge of air inside the power battery and accessories thermal management circuit; the third heat exchanger is configured to exchange heat between the power battery and accessories thermal management circuit and the seawater heat exchange circuit, reducing temperature of coolant flowing through the third heat exchanger; the fifth heat exchanger is configured to exchange heat between the power battery and accessories thermal management circuit and the fuel cell thermal management circuit, increasing the temperature of the coolant flowing through the fifth heat exchanger; and the third electromagnetic three-way valve is configured to regulate heat dissipation.

2. A control method of a ship composite energy power system, using a thermal management system of the ship composite energy power system as claimed in claim 1, comprising the specific content is as follows:

working modes of thermal management is divided into two situations: a cold-start and a normal mode;

the cold-start is divided into two modes: a normal temperature cold-start and a low temperature cold-start;

t0 is the boundary between the low temperature cold-start and the normal temperature cold-start, t1 is a lower limit of a working temperature range of the internal combustion engine, t4 is an upper limit of the working temperature range of the internal combustion engine, t2 is a lower limit of a working temperature range of the hydrogen fuel cell, t5 is an upper limit of the working temperature range of the hydrogen fuel cell, t3 is a lower limit of a working temperature range of the power battery, and t6 is an upper limit of the working temperature range of the power battery;

a low temperature cold-start control method: when ambient temperature is below t0, entering a low temperature cold-start cycle, first starting the internal combustion engine, and the first electromagnetic three-way valve has a small opening to minimize a flow rate through the first heat exchanger; the internal combustion engine thermal management circuit goes through a small cycle, comprising the circulation process that the coolant flows from the first water pump to the internal combustion engine and then to the first expansion water tank, then flows through the fourth heat exchanger, and then flows through the first electromagnetic three-way valve to return to the first water pump; increasing temperature of coolant flowing through the fourth heat exchanger until inlet temperature of the internal combustion engine reaches t1; gradually changing an opening of the first electromagnetic three-way valve to control the temperature of the internal combustion engine to work between t1 and t4; the second electromagnetic three-way valve in the hydrogen fuel cell thermal management circuit has a small opening to minimize a flow rate through the second heat exchanger; the hydrogen fuel cell thermal management circuit goes through a small cycle, comprising the circulation process that the coolant flows from the second water pump to the hydrogen fuel cell and then to the second expansion water tank, and then flows through the fourth heat exchanger and the electric heater, finally returns to the second water pump through the second electromagnetic three-way valve; the electric heater works, raising inlet temperature of the hydrogen fuel cell until the inlet temperature of the hydrogen fuel cell reaches t0, PTC (positive temperature coefficient) electric heater (positive temperature coefficient) electric heater stops working and the hydrogen fuel cell begins to start; when the inlet temperature reaches t2, gradually adjusting an opening of the second electromagnetic three-way valve to control the hydrogen fuel cell work at temperature between t2 and t5; the third electromagnetic three-way valve in the the power battery and accessories thermal management circuit has a small opening to minimize a flow rate through the third heat exchanger; the power battery and accessories thermal management circuit goes through a small cycle, comprising the circulation process that the coolant flows from the third water pump to the power battery and accessories, and then to the fifth heat exchanger, and then flows through the third expansion water tank and returns to the third water pump through the third electromagnetic three-way valve, until inlet temperature of the coolant reaches t0, the power battery begins to supply power to the ship composite energy power system; after the inlet temperature reaches t3, the opening of the third electromagnetic three-way valve is controlled to control the inlet temperature of coolant between t3 and t6;

a normal temperature cold-start method: when the ambient temperature is above t0, entering the normal temperature cold-start cycle; the power battery starts working first to increase the starting speed of the ship, starting the fuel cell and internal combustion engine at the same time; after the internal combustion engine is started, the internal combustion engine works together with the power battery to provide power for a forward movement of the ship, and the hydrogen fuel cell is in idle operation mode before the inlet temperature of the hydrogen fuel cell reaches t2; after the inlet temperature of the hydrogen fuel cell reaches t2, the thermal management system of the ship composite energy power system enters into a normal working mode, the first electromagnetic three-way valve in the internal combustion engine circuit has a small opening in the normal working mode, increasing the temperature of the coolant flowing through the fourth heat exchanger until the inlet temperature of the internal combustion engine reaches t1; the opening of the first electromagnetic three-way valve is gradually changed to control the internal combustion engine to work at the temperature between t1 and t4; the second electromagnetic three-way valve in the hydrogen fuel cell thermal management circuit has a small opening, and the circuit goes through a small cycle to increase the inlet temperature of the hydrogen fuel cell until the inlet temperature of the hydrogen fuel cell reaches t2; the opening of the second electromagnetic three-way valve is gradually adjusted to control the hydrogen fuel cell to work at the temperature between t2 and t5; the third electromagnetic three-way valve in the power battery and accessories thermal management circuit has a small opening, and the circuit goes through a small cycle until the inlet temperature of coolant reaches t3, controlling the opening of the third electromagnetic three-way valve to control the inlet temperature of the coolant between t3 and t6;

temperature control method under normal working mode: calculating an inlet target working temperature based on a current target output power; taking the target working temperature as a feed-forward value, and subtracting the feed-forward value from an actual inlet temperature to obtain an input of the controller; the output of the controller determines the openings of the first electromagnetic three-way valve, the second electromagnetic three-way valve, and the third electromagnetic three-way valve, making the actual temperature close to the target working temperature.

\* \* \* \* \*